United States Patent
Land et al.

(10) Patent No.: US 6,640,765 B2
(45) Date of Patent: Nov. 4, 2003

(54) CYLINDER LINER OF AN INTERNAL COMBUSTION ENGINE

(75) Inventors: Klaus Land, Schlierbach (DE); Franz Rueckert, Ostfildern (DE); Peter Stocker, Sulzbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/251,418

(22) Filed: Sep. 20, 2002

(65) Prior Publication Data
US 2003/0056645 A1 Mar. 27, 2003

(30) Foreign Application Priority Data
Sep. 24, 2001 (DE) .......................................... 101 47 219

(51) Int. Cl.⁷ ................................................. F02F 1/00
(52) U.S. Cl. ................................ 123/193.2; 29/888.061
(58) Field of Search .................... 123/193.2; 29/888.061

(56) References Cited

U.S. PATENT DOCUMENTS 4,153,983 A * 5/1979 Stockton ................ 29/888.061
4,505,234 A * 3/1985 Meiners ................... 123/193.2
5,749,331 A * 5/1998 Pettersson et al. ....... 123/193.2
6,123,052 A * 9/2000 Jahn ........................ 123/193.2
6,298,818 B1 * 10/2001 Koyama et al. ......... 123/193.2

FOREIGN PATENT DOCUMENTS

| DE | 40 20 268 | 8/1991 |
| DE | 197 29 017 | 2/1999 |
| DE | 199 37 934 | 2/2001 |
| DE | 101 03 459 | 9/2001 |

* cited by examiner

*Primary Examiner*—Marguerite McMahon
(74) *Attorney, Agent, or Firm*—Kenyon & Kenyon

(57) ABSTRACT

In a cylinder liner of an internal combustion engine for casting into a light-metal crankcase to be cast, in order, during the casting in of the cylinder liner, to achieve as good a binding as possible of the cylinder liner to the surrounding casting material, the cylinder liner has on the outer circumference, in the region of the upper dead center of the piston rings of a piston guided in the liner, an activation layer which consists of a material which, due to the heat effect of the liquid casting material, connects metallically more rapidly to the latter than the liner material, and in that the cylinder liner has a rough surface on the outer circumference following the region of the upper dead center.

6 Claims, 1 Drawing Sheet

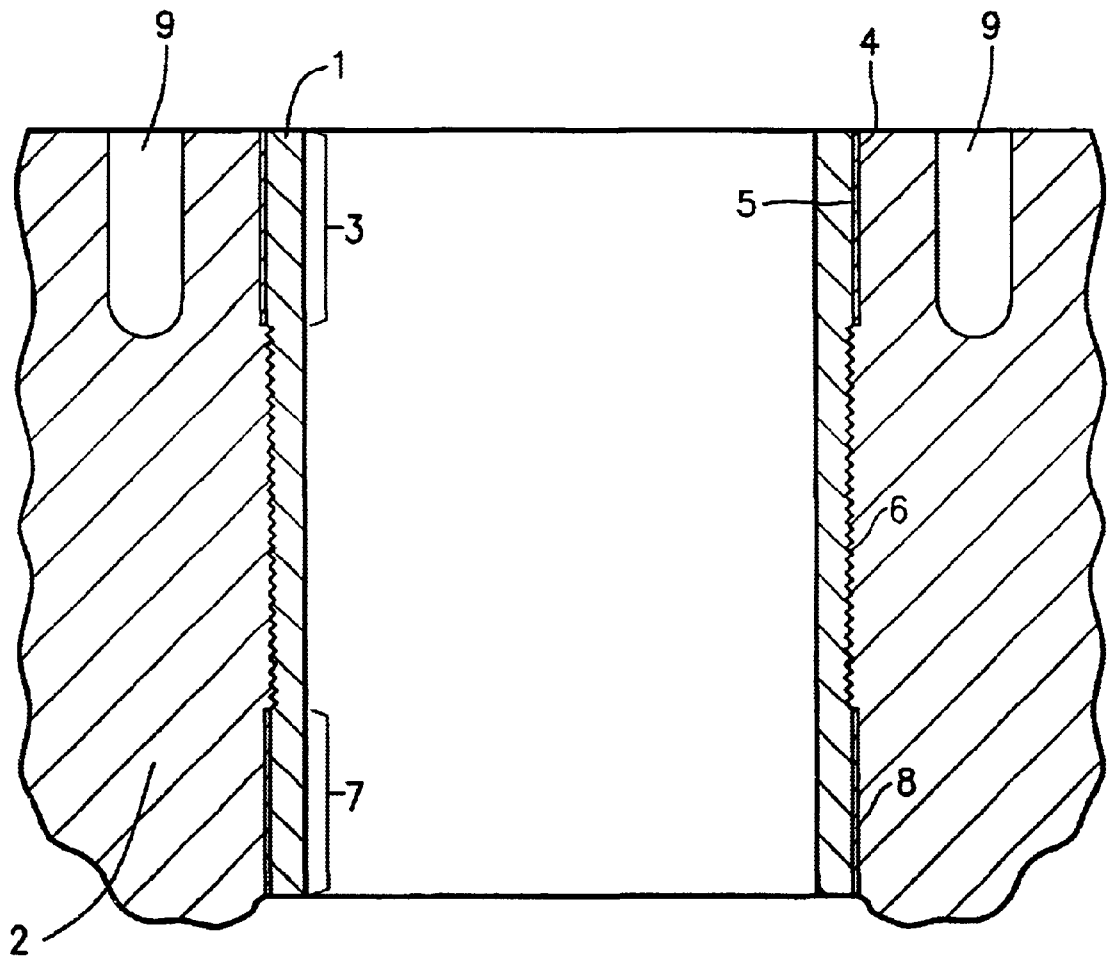
FIGURE

CYLINDER LINER OF AN INTERNAL COMBUSTION ENGINE

CROSS-REFERENCE TO RELATED APPLICATIONS

The present application claims priority to Application No. 101 47 219.6, filed in the Federal Republic of Germany on Sep. 24, 2001, which is expressly incorporated herein in its entirety by reference thereto.

FIELD OF THE INVENTION

The invention relates to a cylinder liner of an internal combustion engine.

BACKGROUND INFORMATION

A cylinder liner is described in German Published Patent Application No. 40 20 268, which describes the production of a cylinder block of an internal combustion engine, in which a cylinder liner is cast into a crankcase consisting of an aluminum alloy in a die-casting or chill-casting process. In order to achieve an improved connection between the cylinder liner and the surrounding casting material, the outside of the cylinder liner is provided with flutes, angular bumps and the like. Furthermore, in the FIGURE shown therein, the end side of the cylinder liner has a balcony-like edge which is intended to counteract settling of the liner during operation of the engine. However, the undercut of the crankcase, which has to be produced for this purpose and serves as an axial support for the edge, can only be achieved with very great difficulty, at least in the die-casting process, so that in this respect the achievement of reliability in the production of the cylinder block with regard to sufficient mechanical binding of the cylinder liner in the crankcase is very questionable.

Furthermore, during the casting in of the cylinder liner it is problematic that the fusing of the liner to the surrounding casting material only takes place incompletely due to the different casting speeds and temperatures which occur in the longitudinal direction of the cylinder during casting, and the different coefficients of expansion of the liner material and of the crankcase material, with the result that, in a completely undesirable manner, gaps are formed or installation takes place without sufficient binding between the liner and surrounding casting material, in particular precisely where the best possible binding of the liner to the surrounding casting material is necessary, namely in the region of the upper dead center of the cylinder.

Due to the insufficient binding of the liner to the surrounding casting material, the required seal-tightness is absent, which has the consequence of water diffusing from the cooling-water jacket into the oil sump of the crankcase through the interface of liner and surrounding casting material. Furthermore, the heat transfer from the liner to the water chamber is restricted as a result. As a consequence of this, the combustion heat cannot be dissipated to a sufficient extent, which results in engine-damaging scorching of the pistons during operation of the engine. Moreover, the poor binding gives rise to combustion-induced vibrations of the cylinder liner in this region, which causes the liner to continuously knock against the surrounding casting material, which is expressed acoustically in a pinging noise. This causes damage to the liner in the long term.

It is an object of the present invention go provide a cylinder liner to the effect that during casting in of the cylinder liner the best possible binding of the cylinder liner to the surrounding casting material may be achieved.

SUMMARY

The above and other beneficial objects of the present invention are achieved by providing a cylinder liner as described herein.

The present invention is based on the finding, which may be surprising to the expert, that as complete as possible fusing of the cylinder liner to the surrounding casting material may be of basic importance only in the region of high combustion pressures in the operation of the engine, i.e. in the region of the upper dead center (upper dead center region) of a piston guided in the liner, whereas a metallic joining of the liner to the surrounding casting material may be necessary only in the region following the upper dead center region. Due to the activation layer which is applied to the circumference of the cylinder liner in the region of the upper dead center (upper dead center region), during casting in of the liner in this region a virtually complete fusion of the liner to the surrounding casting material may be achieved. A continuous, metallic binding of the liner to the surrounding casting material is therefore provided by the layer which acts in a manner promoting the binding. As a result, the radially acting forces which are produced during the combustion may be absorbed without damage and the combustion heat may very readily be conducted away to the cooling-water chamber. In addition, the liner is sealed in the surrounding casting material to the desired extent, as a result of which cooling water may not sweat through gaps into the oil sump of the crankcase. In order to avoid settling of the liner,-the latter is arranged with a rough surface following the upper dead center region, with the result that a mechanical joining of the surrounding casting material to the liner takes place, the joining being able readily to absorb the axially acting pressing forces of the reciprocating piston. The liner according to the present invention therefore fulfils the local requirements with respect to the reliable transmission of forces and seal-tightness. The liner is prevented from being caused to oscillate, which leads to it striking against the surrounding casting material and thereby to undesirable noises and possibly to damage of the liner or of the crankcase, by being integrally formed with the surrounding casting material in the upper dead center region.

The present invention is described in greater detail below with reference to an exemplary embodiment illustrated in the drawing.

BRIEF DESCRIPTION OF THE DRAWING

The FIGURE illustrates a cylinder liner according to the present invention cast in the crankcase, in a lateral longitudinal cross-sectional view.

DETAILED DESCRIPTION

The FIGURE illustrates a detail of a cylinder block of an internal combustion engine, in which a cylinder liner 1 is cast in a crankcase 2 made of light metal, e.g., of aluminum. The cylinder liner 1 has on the outer circumference 4, in the region 3 of the upper dead center of the piston rings of a piston guided in the liner, an activation layer 5 which consists of a material which, due to the heat effect of the liquid casting material, connects metallically more rapidly to the latter than the liner material, for example consisting of low-melting AlSi. In this case, it may be important for the melting point of the liner material to be somewhat higher than that of the layer material, it being possible for the melting point of the layer material to be slightly higher than, or the same as, that of the crankcase material ($T_{liq\ liner} > T_{liq\ layer} \geq T_{liq\ crankcase}$). This has the effect that the liner material and that of the activation layer 5 do not melt in an identical manner under the heat effect of the casting material, and that first of all the layer 5 melts and only then does the liner material undergo melting. In the case of an aluminum crankcase 2, the selection of an aluminum alloy for the formation of the layer 5 may be advantageous, since the metallic binding between the layer 5 and therefore the liner 1 and the crankcase 2 is promoted due to the similarity of the materials. The activation layer 5 is approximately 200 µm thick and is sprayed onto the outer circumference 4 of the cylinder liner 1 in a simple manner in terms of method. In this case, however, other types of application are also possible, for example deposition welding. The web region which is illustrated of the crankcase 2 has a cooling-water cavity 9 which by its depth alone covers the entire upper dead center region 3. A further extent of the cavity 9 in the direction of the lower dead center region 7 may not be necessary, since the main combustion heat is produced in the upper dead center region 3 and is released there to the crankcase 2.

Following the region 3 of the upper dead center, the cylinder liner 1 has a rough surface on the outer circumference 4, as a result of which the mechanical joining of the liner 1 to the crankcase 2 is obtained. This may be achieved in a simple manner if the cylinder liner 1 consists of rough cast iron. In this case, however, the cylinder liner 1 may have to be smoothed before the activation layer 5 is applied to the circumference 4 in the region 3 of the upper dead center, since otherwise the layer 5 may not adhere. In a variant, the cylinder liner 1 may consist of grey cast iron or aluminum, the rough surface being formed by mechanical roughening of the surface, for example by exposure to an abrasive, such as corundum, or to water jets under high pressure, in accordance with the roughness structure of a rough cast iron liner, or by a fluting 6 which, for example, is impressed—as illustrated in the exemplary embodiment. The fluting 6 may ensure particularly good joining.

On the outer circumference 4 of the cylinder liner 1, an activation layer 8 is also formed in the region 7 of the lower dead center. This layer 8, which is formed in the same manner as the activation layer 5 in the region 3 of the upper dead center, is used for sealing off the interface between the cylinder liner 1 and surrounding casting material from the oil sump.

What is claimed is:

1. A cylinder liner of an internal combustion engine for casting into a light-metal crankcase which is to be cast, comprising:

an activation layer on an outer circumference of the cylinder liner in a region of an upper dead center of piston rings of a piston guided in the liner, the activation layer including a material which, due to a heat effect of liquid casting material, is configured to connect metallically more rapidly to the casting material than the liner material; and a rough surface on the outer circumference following the region of the upper dead center.

2. The cylinder liner according to claim 1, wherein the material of the crankcase includes aluminum, and the material of the activation layer is composed of AlSi.

3. The cylinder liner according to claim 1, wherein the activation layer includes a sprayed layer.

4. The cylinder liner according to claim 1, wherein the cylinder liner includes rough cast iron and is smoothed on the circumference in the region of the upper dead center.

5. The cylinder liner according to claim 1, wherein the cylinder liner includes one of grey cast iron and aluminum, the rough surface adjoining the region of the upper dead center includes a roughening of the surface in accordance with a roughness structure of one of a rough cast iron liner and a fluting.

6. The cylinder liner according to claim 1, further comprising an activation layer formed on the outer circumference of the cylinder liner in a region of a lower dead center.

* * * * *